(12) United States Patent
Verma (10) Patent No.: US 9,715,815 B2
(45) Date of Patent: Jul. 25, 2017

(54) WIRELESSLY TETHERED DEVICE TRACKING

(71) Applicant: Apple Inc., Cupertino, CA (US)

(72) Inventor: Sanjay K. Verma, San Jose, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 14/709,414

(22) Filed: May 11, 2015

(65) Prior Publication Data

US 2016/0335876 A1    Nov. 17, 2016

(51) Int. Cl.
| | | |
|---|---|---|
| *G08B 21/24* | (2006.01) | |
| *G01S 3/04* | (2006.01) | |
| *G08B 13/14* | (2006.01) | |
| *G08B 3/10* | (2006.01) | |
| *G08B 21/02* | (2006.01) | |

(52) U.S. Cl.
CPC ............. *G08B 21/24* (2013.01); *G01S 3/046* (2013.01); *G08B 13/1427* (2013.01); *G08B 21/0225* (2013.01); *G08B 21/0277* (2013.01); *G08B 3/10* (2013.01); *G08B 21/0213* (2013.01); *G08B 21/0269* (2013.01)

(58) Field of Classification Search
CPC combination set(s) only.
See application file for complete search history.

(56) References Cited

U.S. PATENT DOCUMENTS

| | | |
|---|---|---|
| 6,166,688 A | 12/2000 | Cromer et al. |
| 6,643,781 B1 | 11/2003 | Merriam |
| 6,662,023 B1 | 12/2003 | Helle |
| 7,890,083 B2 | 2/2011 | Chandran |
| 2012/0322380 A1 | 12/2012 | Nannarone et al. |
| 2013/0227703 A1* | 8/2013 | Sotos ............. H04L 69/14 726/26 |
| 2014/0073262 A1 | 3/2014 | Gutierrez et al. |
| 2015/0105029 A1 | 4/2015 | Russell et al. |

FOREIGN PATENT DOCUMENTS

WO    WO 2014/159873    10/2014

* cited by examiner

*Primary Examiner* — Kabir A Timory
(74) *Attorney, Agent, or Firm* — Fish & Richardson P.C.

(57) ABSTRACT

Systems, methods and computer-readable mediums are disclosed for wirelessly tethered device tracking. In some implementations, a method comprises: determining, by a first wireless device, an estimated distance between the first wireless device and a second wireless device, the second wireless device paired with the first wireless device; selecting, by the first wireless device, a first alarm to be generated by the first wireless device based on the estimated distance; and causing, by the first wireless device, the selected first alarm to be generated on the first wireless device.

20 Claims, 5 Drawing Sheets

WIRELESSLY TETHERED DEVICE TRACKING

TECHNICAL FIELD

This disclosure relates generally to locating misplaced mobile devices.

BACKGROUND

Mobile devices (e.g., smartphones, tablet computers) have become indispensable to many individuals who rely on their devices to communicate with others and to store personal information. Unfortunately, mobile devices can be easily lost or stolen. Some mobile devices include applications that allow a user to find their missing device using another mobile device or desktop computer. These applications help a user locate and track the missing mobile device on a map, remotely lock it, play a sound, display a message or wipe all the data on the mobile device. Although these applications have proven to be effective in locating lost mobile devices there can be a long delay between when the mobile device is misplaced and when the user discovers that the mobile device is missing. During that time, the user could be too far from the mobile device to retrieve the mobile device or the battery on the mobile device could completely deplete resulting in the mobile device no longer providing the data needed by the application to locate the missing mobile device.

SUMMARY

Systems, methods and computer-readable mediums are disclosed for wirelessly tethered device tracking.

In some implementations, a method comprises: determining, by a first wireless device, an estimated distance between the first wireless device and a second wireless device, the second wireless device paired with the first wireless device; selecting, by the first wireless device, a first alarm to be generated by the first wireless device based on the estimated distance; and causing, by the first wireless device, the selected first alarm to be generated on the first wireless device.

In some implementations, a method comprises: broadcasting, by a first wireless device, a radio frequency signal for reception by a second wireless device that is paired with the first wireless device; receiving, by the first wireless device, a request from the second wireless device to generate an alarm by the second wireless device; causing, by the first wireless device, the alarm to be generated by the first wireless device; determining, by the first wireless device, that the first wireless device lost communication with the second wireless device; and causing, by the first wireless device, a communication with a third device that includes a time and location of the lost communication.

Particular implementations disclosed herein provide one or more of the following advantages. A user receives alerts on a monitoring device (e.g., a wearable device) when a paired device that is wirelessly tethered to the monitoring device moves a specified distance away from the monitoring device. With the help of such alerts, the user can immediately sense any mischievous activities with respect to the wirelessly tethered device and can check if the wirelessly tethered device was dropped anywhere in the immediate vicinity of the user.

The alerts (e.g., audible, vibration) can be characterized and configured based on the distance between the paired devices. If the wirelessly tethered device is lost in the vicinity of the monitoring device and the user is unable to visually locate the wirelessly tethered device, a user can start an action from the monitoring device, such as playing an alarm remotely on the wirelessly tethered device.

If the monitoring device moves outside the communication range of the wirelessly tethered device such that accurate proximity detection is no longer possible, the tethered device or the monitoring device can broadcast an alert to other devices or a network server computer in "the cloud" using a variety of communication channels (e.g., email, text message). The broadcast can include the time and location of the wirelessly tethered device of the lost communication.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example System

FIGS. 1A-1D illustrate generating alerts based on estimated distance or proximity to a wirelessly tethered device (hereinafter referred to as "tethered device"). In some implementations, monitoring device 100 and tethered device 102 each include a wireless transceiver (See FIG. 5) configured for communicating with other devices over a wireless medium. Monitoring device 100 can include but is not limited to a wrist watch, glasses, pendant, necklace, ring or any other clothing or accessory that can be fixed to (or stored on) a person's body or held in a person's hand and that is capable of communicating with a tethered device.

Tethered device 102 can include but is not limited to a smart phone, tablet computer, laptop computer, game consul, a wearable device, luggage, bicycle, weapon, media player or any other electronic communication device, equipment or product that is capable of communicating with monitoring device 100.

In some implementations, monitoring device 100 and tethered device 102 can be paired using Bluetooth® protocol. Tethered device 102 can be configured to broadcast a beacon signal. For example, tethered device 102 can be configured as a Bluetooth® Low Energy (BLE) beacon that broadcasts radio frequency (RF) signals according to BLE protocol that can be heard by compatible devices. In other implementations, other known protocols can be used for communicating, such as WiFi Direct, Near Field Communications (NFC), ZigBee™. The examples below assume the monitoring device 100 and tethered device 102 are "paired" using Bluetooth® protocol.

Figure 1A:
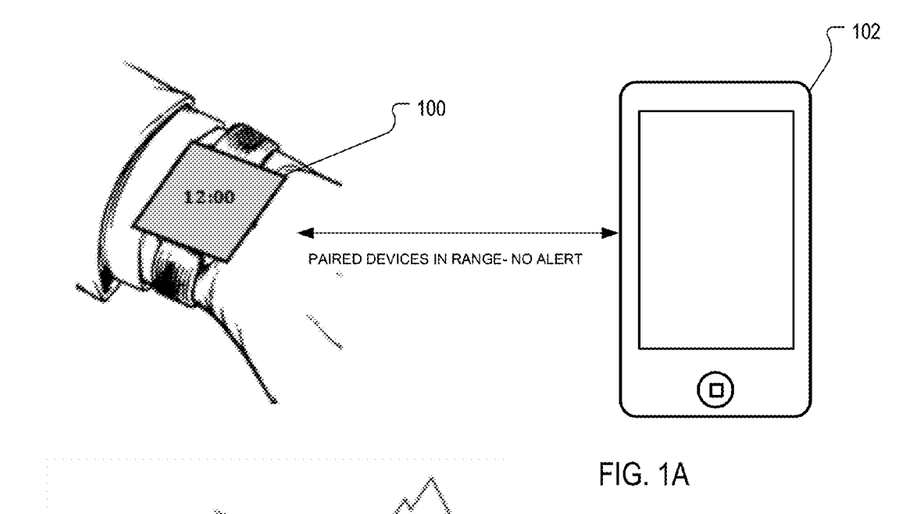
FIGS. 1A-1D illustrate generating alerts based on estimated distance or proximity to a wirelessly tethered device.

FIG. 1A illustrates the case where the paired devices 100, 102 are in range. In this example, monitoring device 100 is a wristwatch and tethered device 102 is a smart phone. Monitoring device 100 receives an RF signal transmitted by tethered device 102 and computes a signal strength metric, such as Received Signal Strength Indicator (RSSI) value. Based on RSSI values, an estimated distance or proximity range between the paired devices 100, 102 can be calculated or determined and compared with a threshold distance value. If the paired devices 100, 102 are within a threshold distance of each other (e.g., a threshold distance value is exceeded), no alert is generated. In some implementations, feedback can be provided by monitoring device 100 to indicate a "no alert" state, including but not limited to: changing the color of a display (e.g., the watch face is changed to Green) or periodically generating an audible output or force feedback (E.g., vibration). In some implementations no feedback is provided when monitoring device 100 is in a "no alert" state.

In some implementations, instead of directly comparing distances with distance thresholds, proximity ranges can be used to trigger alerts. For example, iBeacon® protocol developed by Apple Inc. of Cupertino Calif. USA specifies three proximity ranges: "Immediate" (within a few centimeters), "Near" (within a couple of meters) and "Far" (greater than 10 meters away). A different alert can be generated for each proximity range. For example, if monitoring device 100 is a wristwatch (e.g., a smart watch), then "Immediate" could generate a Green watch face, "Near" could generate an Orange watch face and "Far" could generate a Red watch face.

Figure 1B:
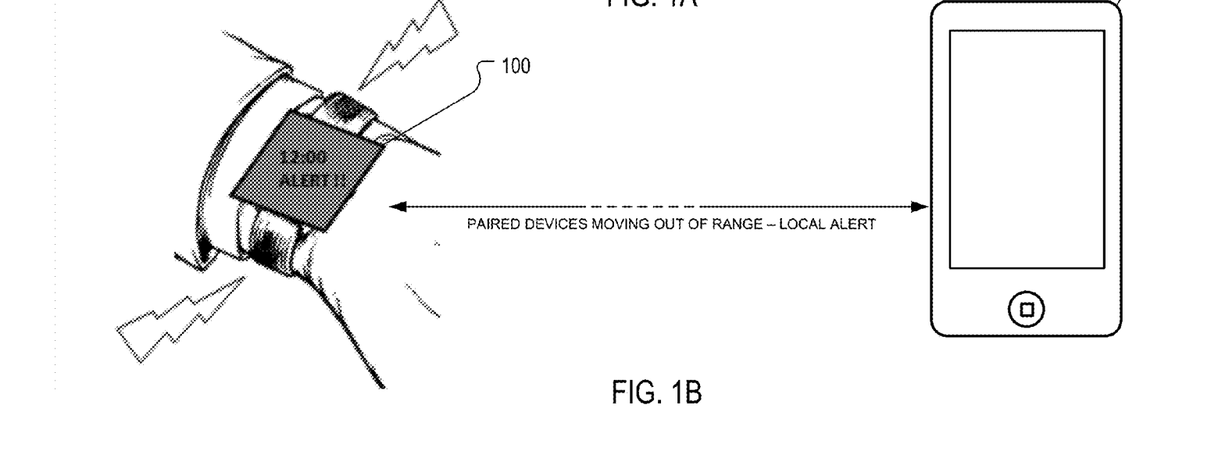

FIG. 1B illustrates a case where paired devices 100, 102 move a threshold distance apart. In this example scenario, monitoring device 100 generates a local alert to indicate a potential misplaced device event. In some implementations, the local alert can be triggered when an estimated distance calculated from RSSI values exceeds a specified threshold distance. This threshold distance can vary from, for example, a meter to 100 meters based on the maximum communication range of the particular communication technology employed by paired devices 100, 102. In some implementations, there can be multiple threshold distances that can trigger alerts with increasing urgency. For example, when a first distance threshold is exceeded, a first alert can be generated and when a second distance threshold is exceeded, a second alert can be generated and so forth. The user feedback generated by each alert can be more urgent as the estimated distance between paired devices 100, 102 increases. For example, when a first distance threshold is exceeded (e.g., 1 meter), a display on monitoring device 100 can change color (e.g. change to Orange), and when the second distance threshold is exceeded, a display on monitoring device 100 can change color again (e.g., change to Red) and/or additional feedback can be generated, such as audible output (e.g., beep tone, ringtone, sound effect, digital assistant message), force or tactile feedback (e.g., vibration), flashing screen, a badge, icon or other graphic. In some implementations, a vibration frequency or pattern can change based on the distance between paired devices 100, 102. For example, a first vibration alert can be a single pulse and a second vibration alert can be a series of pulses or pulse train. In some implementations, the user or application can configure different alerts and distance thresholds using a settings menu.

Figure 1C:
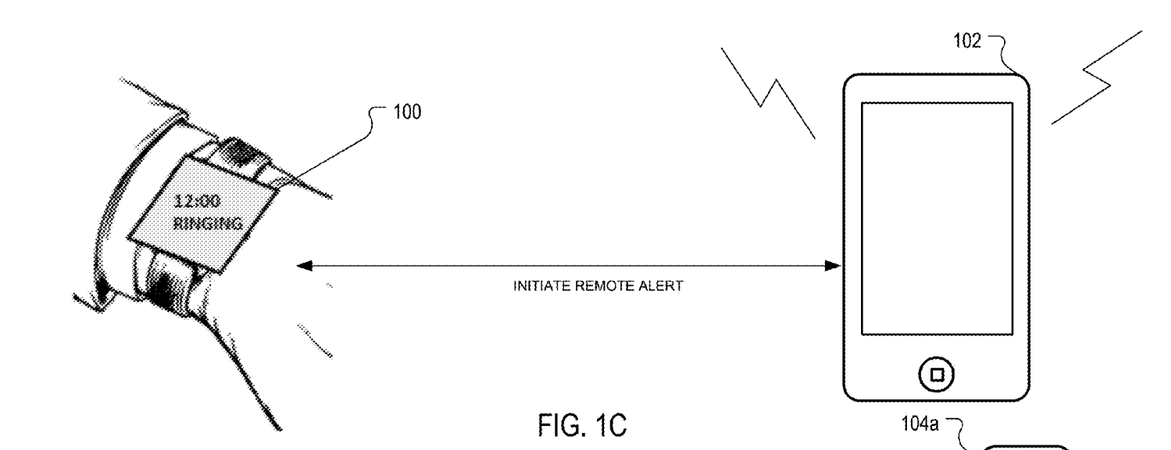

FIG. 1C illustrates a case where the user can initiate an action from monitoring device 100 when the tethered device 102 can be located after receiving an alert. In some implementations, the user can select a user interface element or hardware input (e.g., button, crown) on monitoring device 100 to send an alert code directly or indirectly to tethered device 102 to generate an audible output to assist the user in locating tethered device 102. For example, the alert code can command tethered device 102 to play an alarm (e.g., a BEEP) to assist the user in locating tethered device 102. In some implementations, the volume of an audio system (See FIG. 5) of tethered device 102 can be increased in response to the alert code to further assist the user in locating tethered device 102. In some implementations, tethered device 102 automatically adjusts its volume based on ambient noise in the environment. For example, a microphone of tethered device 102 or monitoring device 100 can be used to sample the ambient noise level of the local environment and the volume can be increased to a level of above the ambient noise level to ensure that the audible alarm can be heard by the user.

In some implementations, tethered device 102 can initiate the alarm automatically based on its own estimated distance calculation or determined proximity range using, for example, RSSI values generated from RF signals transmitted from monitoring device 100. In this latter scenario, monitoring device 100 can be configured as an RF beacon that transmits RF signals. The alert code for initiating a remote alarm on tethered device 102 can be included in data packet transmitted or broadcast from monitoring device 100 (e.g., Bluetooth® advertising packet payload).

Figure 1D:
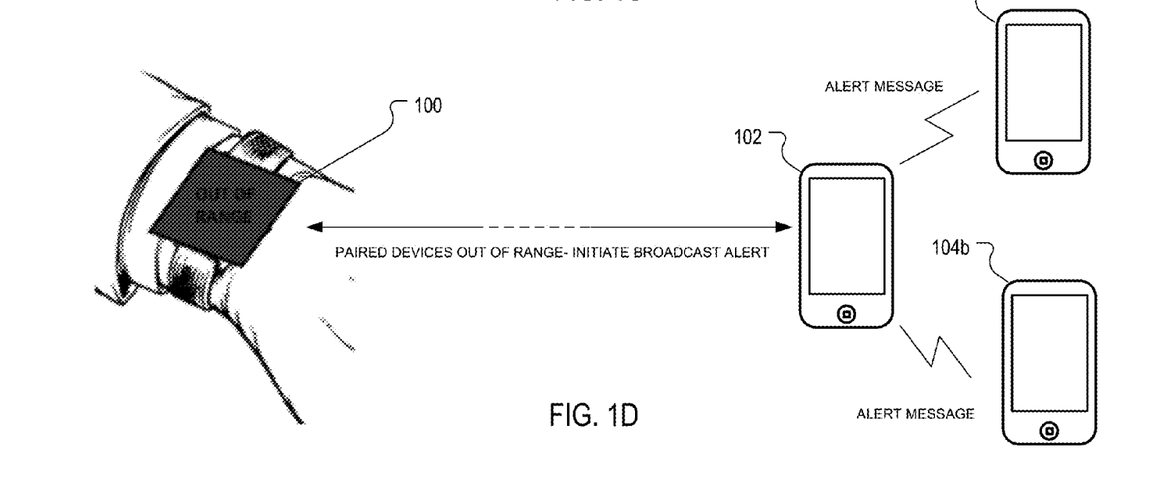

FIG. 1D illustrates a case where monitoring device 100 has moved to a distance not sufficient to estimate accurately a distance or determine a proximity range of tethered device 102 and is about to lose communication with tethered device 102. In this scenario, tethered device 102 can broadcast information to other devices directly (peer-to-peer (P2P)) or indirectly through a network (e.g., the Internet). The broadcast information can be a text message, email, telephone call, tweet or any other communication medium. The time and location of lost communication with the tethered device 102 can be included in the broadcast information. The current location (e.g., latitude, longitude) can be determined by a positioning system embedded in or coupled to tethered device 102 using satellite or network based location technology, such as a Global Navigation Satellite System (GNSS) receiver or Wi-Fi or cellular positioning systems. The time can be taken from a local clock of tethered device 102. In some implementations, the broadcast information can include device or subscriber information, such as a Mobile Equipment Identifier (MEID) or International Mobile Subscriber Identity (IMSI).

In some implementations, the user can configure tethered device 102 to store a list of emergency contacts that include telephone numbers, email addresses and/or other contact information to allow the information to be communicated to the emergency contacts. For example, an address book installed on tethered device 102 can allow a user to designate emergency contacts by, for example, setting or checking an emergency contact field/box in the contact.

In some implementations, during or after the broadcast of information, tethered device 102 can automatically enter lock screen mode (if previously unlocked) and display a message on the locked screen. Tethered device 102 can stay in lock screen mode until a master passcode is entered. If someone attempts multiple times to unlock tethered device 102 with an incorrect passcode, an alarm code can be sent to monitoring device 100 and/or any other devices that are synchronized or otherwise in communication with tethered device 102 to initiate further action (e.g., wiping the device).

Figure 2:
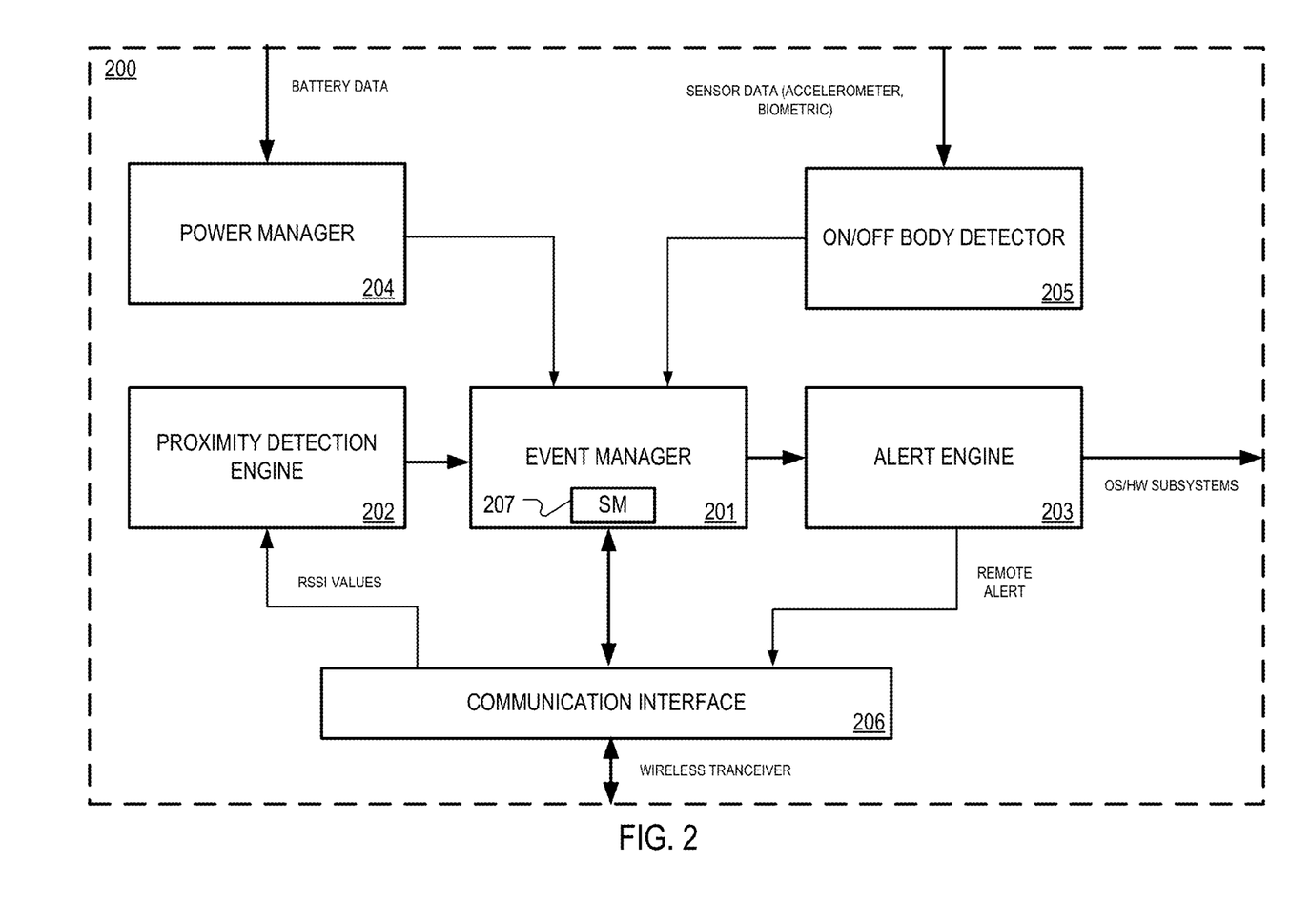
FIG. 2 is a conceptual block diagram illustrating functional blocks of an example system for generating alerts based on estimated distance or proximity to a wirelessly tethered device.

FIG. 2 is a conceptual block diagram illustrating functional blocks of an example system 200 for generating alerts based on estimated distance or proximity range. System 200 can be included in monitoring device 100. System 200 can be implemented in software, hardware or a combination of hardware and software. Software can be executed by processor(s) or processing cores in monitoring device 100 as described in reference to FIG. 5.

In some implementations, system 200 can include event manager 201, proximity detection engine 202, alert engine 203, power manager 204, on/off body detector 205 and communication interface 206.

Event manager 201 receives inputs from power manager 204, on-off body detector 205 and proximity detection engine 202. Based on these inputs, event manager 201 sends alert codes to alert engine 203 to generate an appropriate alert. In some implementations, event manager 201 implements state machine (SM) 207 that outputs different alert codes based on the inputs.

Communication interface 206 includes code for receiving RSSI values or proximity ranges from a wireless transceiver. Proximity detection engine 202 compares the RSSI values with distance thresholds (e.g., provided by settings data) to determine if a distance threshold has been exceeded. If exceeded, proximity detection engine 202 sends a proximity detection event signal to event manager 201. The proximity detection event signal can be encoded to indicate the distance threshold has been exceeded. If proximity detection engine receives proximity ranges (e.g., Immediate, Near, Far, Unknown), the proximity detection event signal can be encoded to indicate the received proximity range. Event manager 201 sends an alert code to alert engine 203 indicating the occurrence of an event.

Alert engine 203 initiates an appropriate alert in response to the alert code. For example, alert engine 203 can determine whether a remote alert is to occur on tethered device 102 or a local alert is to occur on monitoring device 100. If a remote alert, the alert code is input to communication interface 206 where it can be packaged and transmitted to tethered device 102. In some implementations, the alert code is sent in a Bluetooth® advertising packet payload to tethered device 102 by a wireless transceiver. If a local alert, the encoded alert signal is transmitted to the device operating system and/or hardware subsystem(s), where it is used to generate a local alert on monitoring device 100, such as changing the color of a display, generating an audible output and/or generating a vibration or other force or tactile feedback.

Power manager 204 receives battery data and generates a battery signal that is encoded to indicate battery power status. For example, there can be four battery power levels L1-L4, where L4 can indicate a fully charged battery, L1 can indicate a fully discharged battery and L2, L3 can indicate intermediate battery power levels. Event manager 201 can use the received battery power level to select a type of alert that will be implemented by alert engine 203. For example, if the battery power level is L4 than any alert may be implemented regardless of the power consumption caused by the alert. If, however, the battery power level is L1 or L2 than an alert that takes less power (e.g., audible BEEP) can be used in place of the alert that would be selected when the battery power level is L4 (e.g., changing the color of the display). For example, an alert changing the color of a display requires the device to be fully awake and the display to be "lit", which results in a higher power consumption than an audible BEEP. If the battery level is L1 or L2, alert engine 203 can be commanded by event manager 201 to send a message (with an alert code) to tethered device 102 indicating the low battery power level and that any future alerts should be handled by tethered device 102. Tethered device 102 can then perform an action, such as monitoring its own RSSI values for proximity detection and/or entering a "lost" mode, which can include but is not limited to one or more of entering lock screen mode, displaying a message on the locked screen, playing an alarm, remote wiping the device and tracking the location of the device. For example, if a proximity range is detected (e.g., "Near") that calls for a local alert (e.g., change screen color to Red) and the battery life is low (e.g., L2), the local alert that would have been generated on monitoring device 100 (Red display) can be replaced with a remote alert on tethered device 102 (e.g., an audible sound).

In some implementations, system 200 includes on/off body detector 205, which determines whether the monitoring device 100 is on or off the user's body. If the monitoring device 100 is "off body" such as occurs when the device is sitting on a table or in a drawer, then event manager 201 can disable all or parts of system 200 to put system 200 in a low power mode (e.g., sleep mode). On/off body detector 205 can determine whether monitoring device 100 is "on body" using sensor data. For example, accelerometer data can indicate whether there are accelerations present that indicate that monitoring device 100 (a wristwatch in this example) is on the user's body. In some implementations, biometric sensors can be included in monitoring device 100 for detecting a heartbeat or temperature to indicate that the user is wearing monitoring device 100. In some implementations, a light sensor, proximity sensor and/or orientation sensor (e.g., a gyro sensor) can determine if monitoring device 100 is on or attached to the user's body but stored in a pocket, purse or briefcase where a visual alert on a display would not be seen by the user.

In some implementations, state machine 207 implemented in event manager 201 can output alert codes to alert engine 203 based on a combination of three inputs representing the current state of system 200: Range (Immediate, Near, Far, Unknown), Power (L1-L4) and On/Off Body (ON or OFF). An alert code can therefore take on 16 values (in binary coded decimal) representing various possible combinations of inputs. Table I below illustrates some example state/alert code mappings.

TABLE I

Example State/Alert Code Mappings

| Proximity Range | Battery Power Level | On/Off Body | Alert Code |
|---|---|---|---|
| Immediate | L1-L4 | ON/OFF | 0000 |
| Near | L4 | ON | 0010 |
| Near | L1/L2 | ON | 0011 |
| Near | L1-L4 | OFF | 0100 |
| Far | L4 | ON | 0101 |
| Far | L1/L2 | ON | 0110 |
| Far | L1-L4 | OFF | 1000 |
| Unknown | L1-L4 | ON/OFF | 1001 |

Example Processes

Figure 3:
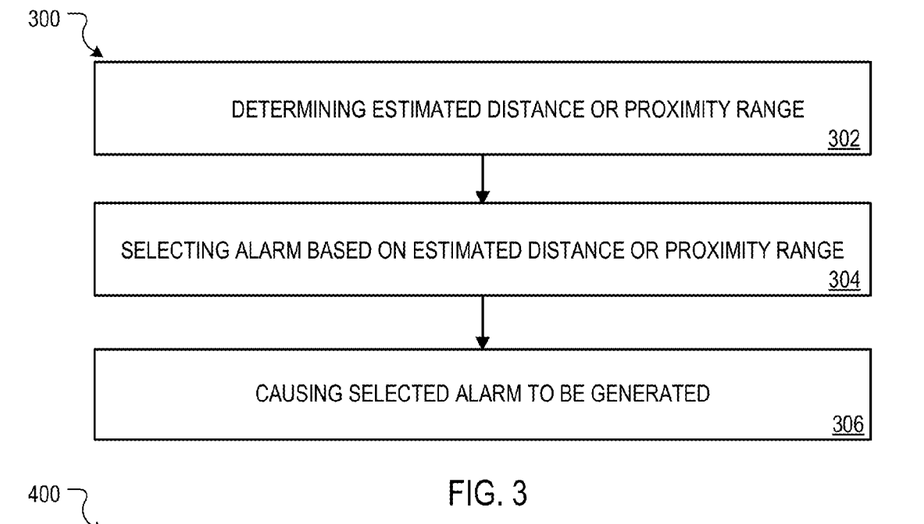
FIG. 3 is a flow diagram of an example process performed by a monitoring device.

FIG. 3 is a flow diagram of an example process 300 performed by monitoring device 100. Process 300 can be implemented by the device architecture 500, as described in reference to FIG. 5.

In some implementations, process 300 can begin by determining, by a first wireless device, an estimated distance or proximity range (302). The first and second wireless devices can be paired devices using, for example, Bluetooth® protocol. A first wireless device can be, for example, a wearable device such as a smart watch.

Process 300 can continue by selecting, by the first wireless device, an alarm to be generated by the first wireless device based on the estimated distance or proximity range (304). For example, the estimated distance or proximity range can be determined by comparing a received signal strength (e.g., RSSI values) with threshold distances. In some implementations, RSSI values can be averaged using, for example, a moving average.

In some implementations, proximity ranges can be determined as described in U.S. patent application Ser. No. 13/905,552, for "Range Class Estimation for Radio Frequency Devices," filed May 30, 2013, which patent application is incorporated by reference herein in its entirety.

Process 300 can continue by causing, by the first wireless device, the selected alarm to be generated on the first wireless device or the second wireless device (306). For example, a state machine running on the first wireless device can select an alarm code based on the estimated distance or proximity range and other inputs such as battery power level and whether the device is on the user's body.

In some implementations, on/off body detection can be implemented as described in U.S. patent application Ser. No. 14/292,750, for "Determination of Device Body Location," filed May 30, 2014, which patent application is incorporated by reference herein in its entirety.

Figure 4:
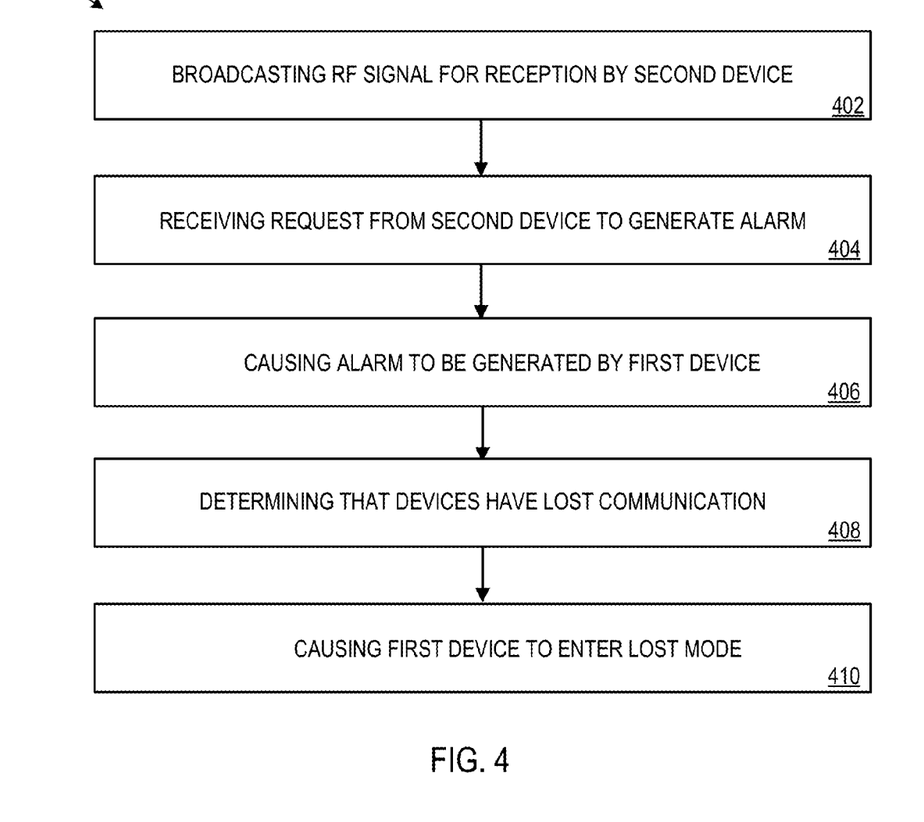
FIG. 4 is a flow diagram of an example process performed by a wirelessly tethered device.

FIG. 4 is a flow diagram of an example process 400 performed by tethered device 102. Process 400 can be implemented by device architecture 500, as described in reference to FIG. 5.

In some implementations process 400 can begin by broadcasting, by a first wireless device (the tethered device), an RF signal for reception by a second wireless device (e.g., a wearable device) that is paired with the first wireless device (402). For example, the first wireless device can be configured to operate as an RF beacon, such as, for example, a BLE beacon that is configured to comply with iBeacon® protocol.

Process 400 can continue by receiving, by the first wireless device, a request from the second wireless device to generate an alarm by the first wireless device (404). For example, the second wireless device can send an alarm code to the second wireless device over a direct or indirect communication link. If Bluetooth® protocol is used for a direct (P2P) communication link, the alarm code can be included in a Bluetooth® advertising packet payload. Alarm codes can also be sent through a network server computer, such as a text message or email server computer.

Process 400 can continue by causing, by the first wireless device, the alarm to be generated by the first wireless device (406). For example, in response to receiving an alarm code, the first wireless device can command the appropriate hardware subsystem (e.g., LED display, piezoelectric buzzer, audio system) to generate the alarm corresponding to the alarm code, such as, for example, changing the color of a display, flashing the display, generating an audible output such as a BEEP or other sound effect and/or generating a single vibration (a pulse) or a vibration pattern (a pulse train).

Process 400 can continue by determining, by the first wireless device, that the first wireless device is about to lose communication with the second wireless device (408). For example, if the devices are too far apart they will not be able to effectively communicate. This situation can be detected by detecting RSSI values dropping below a specified threshold (e.g., in dbm) or by a received proximity state (e.g., Unknown state). In some implementations, the second wireless device (which is monitoring RSSI values) can send an alert code to the first wireless device when it anticipates or predicts based on the RSSI values that communication with the first wireless device will soon be lost.

Process 400 can continue by causing, by the first wireless device, the first wireless device to enter a "lost" mode, the "lost" mode including communicating to a third device a time and location of the lost communication (410). For example, in response to receiving an alert code from the second wireless device that communication will soon be lost, the first wireless device can automatically initiate a "lost" mode on the first wireless device. The "lost" mode can include but is not limited to entering a lock screen mode, playing a sound, displaying a message or wiping all or some of the data on the first wireless device. The time and location of the lost communication can be transmitted to one or more other devices that are synchronized or otherwise associated with the first wireless device In some implementations, the second wireless device can send a periodic "heart beat" signal to the first wireless device. If the "heart beat" signal is not detected after a configured period of time, the first wireless device can automatically enter 'lost" mode.

In some implementations, the time and location information can be uploaded to a network server computer/database ("the cloud"), where it can be used by a tracking or lost device application that can be accessed or run by another device. In some implementations, an address book or contacts application stored on the first wireless device or on the network can be accessed to determine one or more emergency contacts where the "lost" mode information can be communicated using, for example, a text message, iMessage®, page, telephone call, Tweet® and/or email. In some implementations, a device identifier (e.g., MEID, IMSI) can be included in the information.

Example Device Architecture

Figure 5:
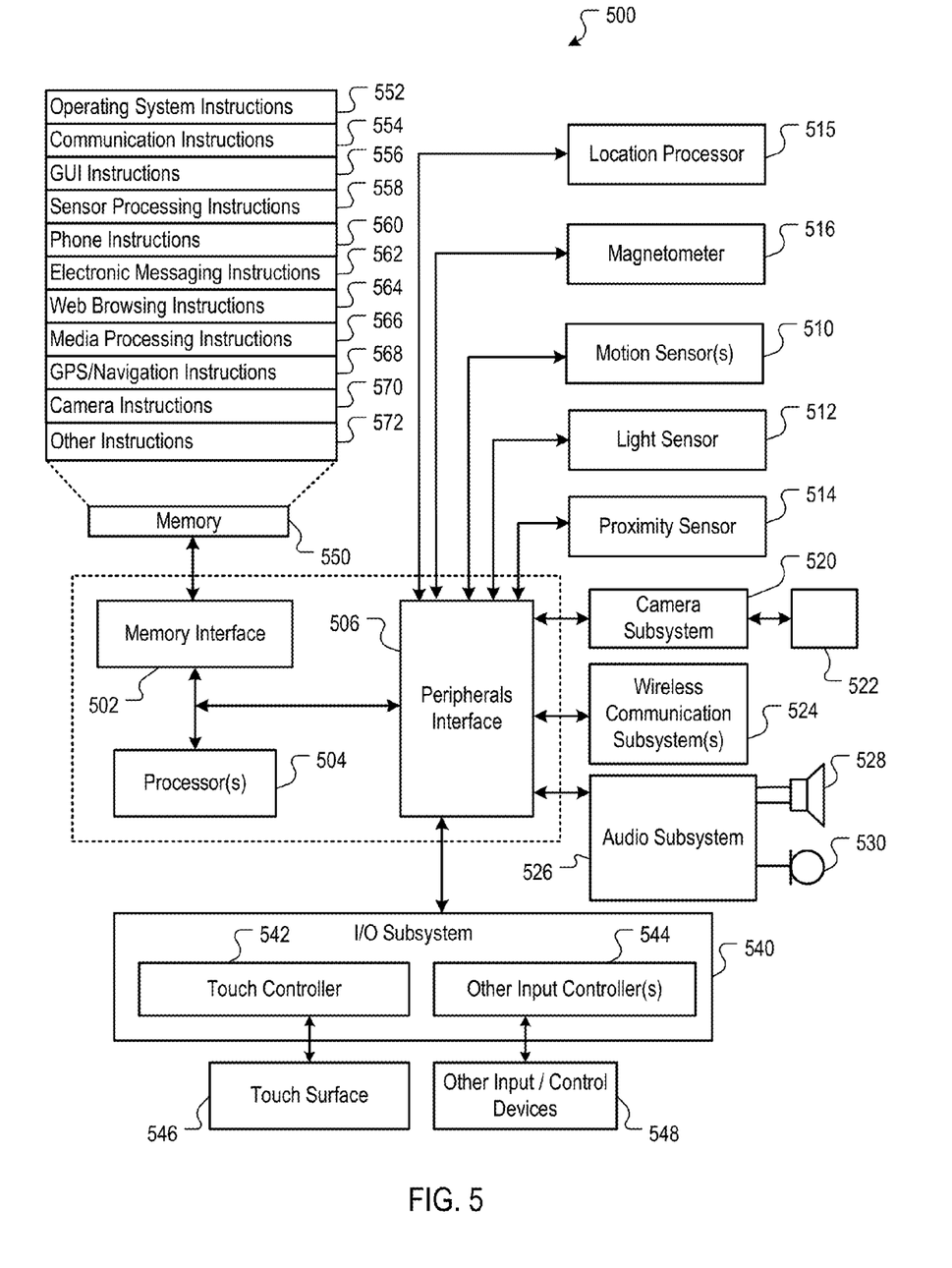
FIG. 5 is a block diagram of example device architecture for implementing the features and processes described in reference to FIGS. 1-4.

FIG. 5 is a block diagram of example device architecture 500 for implementing the features and processes described in reference to FIGS. 1-4. Architecture 500 may be implemented in any location aware mobile device for generating the features described in reference to FIGS. 1-4, including but not limited to portable computers, smart phones, tablet computers, game consoles, wearable computers and the like. Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor 510, light sensor 512, and proximity sensor 514 may be coupled to peripherals interface 506 to facilitate orientation, lighting, and proximity functions of the device. For example, in some implementations, light sensor 512 may be utilized to facilitate adjusting the brightness of touch surface 546. In some implementations, motion sensor 510 (e.g., an accelerometer, gyros) may be utilized to detect movement and orientation of the device.

Accordingly, display objects or media may be presented according to a detected orientation (e.g., portrait or landscape).

Other sensors may also be connected to peripherals interface 506, such as a temperature sensor, a biometric sensor, or other sensing device, to facilitate related functionalities.

Location processor 515 (e.g., GNSS receiver chip) may be connected to peripherals interface 506 to provide georeferencing. Electronic magnetometer 516 (e.g., an integrated circuit chip) may also be connected to peripherals interface 506 to provide data that may be used to determine the direction of magnetic North. Thus, electronic magnetometer 516 may be used as an electronic compass.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication subsystems 524 may include radio frequency receivers and transmitters and/or optical (e g, infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 524 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 526 may be coupled to a speaker 528 and one or more microphones 530 to facilitate voice-enabled functions, such as voice recognition, voice replication, digital recording, and telephony functions.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, device architecture 500 may present recorded audio and/or video files, such as MP3, AAC, and MPEG video files. In some implementations, device architecture 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 may include a kernel (e.g., UNIX kernel).

Memory 550 may also store communication instructions 554 to facilitate communicating with one or more additional devices, one or more computers or servers, including peer-to-peer communications. Communication instructions 554 may also be used to select an operational mode or communication medium for use by the device, based on a geographic location (obtained by the GPS/Navigation instructions 568) of the device.

Memory 550 may include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes; camera instructions 570 to facilitate camera-related processes and functions; and other instructions 572 for performing some or all of the processes, as described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    determining, by a first wireless device, a first estimated distance between the first wireless device and a second wireless device, the second wireless device in wireless communication with the first wireless device;
    determining, by the first wireless device, a first level of urgency from a plurality of urgency levels based on the first estimated distance;
    determining, by the first wireless device, a first alarm to be presented by the second wireless device based on the first level of urgency;
    causing, by the first wireless device, the selected first alarm to be presented on the second wireless device;
    determining, by the first wireless device, a second estimated distance between the first wireless device and the second wireless device, wherein the second estimated distance is greater than the first estimated distance;
    determining, by the first wireless device, a second level of urgency based on the second estimated distance;
    determining, by the first wireless device, a second alarm to be presented by the second wireless device based on the second level of urgency, the second alarm configured to be more urgent than the first alarm; and
    causing, by the first wireless device, the selected second alarm to be presented on the second wireless device.

2. The method of claim 1, wherein determining the first or second estimated distance further comprises:
    receiving, by the first wireless device, a radio frequency (RF) signal transmitted by the second wireless device;
    determining, by the first wireless device, a proximity range to be the first or second estimated distance based on a received strength of the RF signal.

3. The method of claim 1, wherein selecting the first alarm to be presented further comprises:
    providing, by the first wireless device, the first estimated distance as an input to a state machine implemented on the first wireless device; and
    selecting, by the first wireless device, the first alarm code based on an output of the state machine.

4. The method of claim 3, further comprising:
    determining, by the first wireless device, a battery status of a battery of the second wireless device; and
    providing, by the first wireless device, the battery status as input into the state machine.

5. The method of claim 3, further comprising:
    determining, by the first wireless device, whether the second wireless device is on a user's body; and
    providing, by the first wireless device, a result of the determining as input to the state machine.

6. The method of claim 1, wherein the selected first alarm includes one or more of changing a display color, flashing a display, generating an audible output and generating force or tactile feedback.

7. The method of claim 1, further comprising:
    determining, by the first wireless device based on the second estimated distance, that communication with the second wireless device is about to be lost; and
    prior to losing communication with the second wireless device, sending information over a second communication link that is different than the first communication link, the information including a location of the first wireless communication device.

8. The method of claim 1, further comprising:
    receiving, by the first wireless device, input requesting the second wireless device to present the first or second alarm; and
    sending, by the first wireless device, an alert code to the second wireless device commanding the second wireless device to present the first or second alarm.

9. The method of claim 7, further comprising:
    causing, by the first wireless device, a communication with a third device over the second communication link that includes the location of the first wireless device.

10. The method of claim 9, wherein causing, by the first wireless device, the communication with the third device, further comprises:
    obtaining, by the first wireless device, emergency contact information stored on the first wireless device; and
    communicating, by the first wireless device, with the third device using the emergency contact information.

11. A system comprising:
    one or more processors;
    one or more computer-readable mediums coupled to the one or more processors and configured to store instructions, which, when executed by the one or more processors, causes the one or more processors to perform operations comprising:
        determining a first estimated distance between the system and a second wireless device, the second wireless device in wireless communication with the system;
        determining a first level of urgency from a plurality of urgency levels based on the first estimated distance;
        determining a first alarm to be presented by the second wireless device based on the first level of urgency;
        causing the selected first alarm to be presented on the second wireless device;
        determining a second estimated distance between the system and the second wireless device, wherein the second estimated distance is greater than the first estimated distance;
        determining a second level of urgency from the plurality of urgency levels based on the second estimated distance;
        determining a second alarm to be presented by the second wireless device based on the second level of urgency, the second alarm configured to be more urgent than the first alarm; and
        causing the selected second alarm to be presented on the second wireless device.

12. The system of claim 11, wherein determining the first or second estimated distance further comprises:
    receiving a radio frequency (RF) signal transmitted by the second wireless device; and determining a proximity range to be the first or second estimated distance based on a received strength of the RF signal.

13. The system of claim 11, wherein selecting the first alarm to be presented on the second wireless device further comprises:
    providing the first estimated distance as an input to a state machine; and
    selecting the first alarm code based on an output of the state machine.

14. The system of claim 13, wherein the operations further comprise:
    determining a battery status of a battery of the second wireless device; and
    providing the battery status as input into the state machine.

15. The system of claim 13, wherein the operations further comprise:
    determining whether the second wireless device is on a user's body; and
    providing a result of the determining as input to the state machine.

16. The system of claim 11, wherein the selected first alarm includes one or more of changing a display color, flashing a display, generating an audible output and generating force or tactile feedback.

17. The system of claim 11, wherein the operations further comprise:
    determining, based on the second estimated distance, that communication with the second wireless device is about to be lost; and
    prior to losing communication with the second wireless device, sending information over a second communication link that is different than the first communication link, the information including a location of the first wireless communication device.

18. The system of claim 11, wherein the operations further comprise:
    receiving input requesting the second wireless device to present the first or second alarm; and
    sending an alert code to the second wireless device commanding the second wireless device to present the first or second alarm.

19. A non-transitory, computer-readable storage medium having instructions stored thereon, which, when executed by one or more processors, causes the one or more processors to perform operations comprising:
    determining a first estimated distance between a system and a second wireless device, the second wireless device in wireless communication with the system;
    determining a first level of urgency from a plurality of urgency levels based on the first estimated distance;
    determining a first alarm to be presented by the second wireless device based on the first level of urgency;
    causing the selected first alarm to be presented on the second wireless device;
    determining a second estimated distance between the system and the second wireless device, wherein the second estimated distance is greater than the first estimated distance;
    determining a second level of urgency from the plurality of urgency levels based on the second estimated distance;
    determining a second alarm to be presented by the second wireless device based on the second level of urgency, the second alarm configured to be more urgent than the first alarm; and
    causing the selected second alarm to be presented on the second wireless device.

20. The system of claim 19,
    determining, based on the second estimated distance, that communication with the second wireless device is about to be lost; and
    prior to losing communication with the second wireless device, sending information over a second communication link that is different than the first communication link, the information including a location of the first wireless communication device.

* * * * *